(12) United States Patent
Berrier et al.

(10) Patent No.: US 6,432,495 B1
(45) Date of Patent: Aug. 13, 2002

(54) ABRASION RESISTANT AIR BAG

(75) Inventors: Walter Gene Berrier; John Leslie Harrington, both of Sheridan; John Joe Howlett, Jr., Hensley, all of AR (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/345,397

(22) Filed: Jul. 1, 1999

(51) Int. Cl.[7] .................................................. B60P 7/16
(52) U.S. Cl. .................... 428/34.2; 428/34.1; 428/34.3; 428/68; 428/76; 206/522; 206/594
(58) Field of Search .............................. 428/34.1, 34.2, 428/34.3, 68, 76, 124, 126; 206/522, 594; 220/232; 383/3; 410/119; 138/93; 128/DIG. 20; 602/13

(56) References Cited

U.S. PATENT DOCUMENTS

| | | | |
|---|---|---|---|
| 3,199,689 A | * 8/1965 | Feldkamp | 214/10.5 |
| 3,506,143 A | * 4/1970 | Evans | 206/522 |
| 3,955,690 A | * 5/1976 | Baxter | 410/118 |
| 4,591,519 A | 5/1986 | Liebel | 428/35 |
| 5,788,438 A | 8/1998 | Goshorn et al. | 410/119 |

* cited by examiner

Primary Examiner—Harold Pyon
Assistant Examiner—Alicia Chevalier
(74) Attorney, Agent, or Firm—Schwartz & Weinrieb

(57) ABSTRACT

An abrasion resistant air bag comprises an outer tubular liner board member having a pair of parallel ply sections defining an internal space therebetween, and an inflatable bladder disposed internally thereof. In order to close and seal the opposite open ends of the outer tubular liner board member, and thereby form the abrasion resistant air bag, a pair of liner board end cap members are adhesively bonded upon the opposite open ends of the outer tubular liner board member. The end caps are formed from initially flat, scored pieces of liner board which are folded in half upon themselves whereupon each leg member or half-section of the end cap is adhesively bonded to an outer surface portion of a respective one of the outer tubular liner board ply sections.

21 Claims, 2 Drawing Sheets

ABRASION RESISTANT AIR BAG

FIELD OF THE INVENTION

The present invention relates generally to inflatable cargo or dunnage air bags, and more particularly to a new and improved abrasion-resistant inflatable cargo or dunnage air bag and a method of manufacturing the same.

BACKGROUND OF THE INVENTION

Inflatable cargo or dunnage air bags are conventionally used within cargo holds or bays of ships, railroad cars, trucks, airplanes, and the like, in order to brace the cargo loads or prevent inadvertent or undesirable movement of the cargo loads during shipping so as to thereby prevent damage to the cargo loads that would otherwise occur as a result of such unwanted movements thereof. Such cargo bags typically comprise a thermoplastic inflatable bladder which is disposed within an outer bag, formed by means of a plurality of paper plies, paperboard, cardboard, or the like, wherein the outer bag serves to protect the bladder from being punctured or otherwise damaged. The inflatable bladder is provided with an inflation valve which is hermetically sealed with respect to the inflatable bladder and which projects externally of the outer bag so as to permit inflation of the composite cargo bag.

The aforenoted type of air bag is typically manufactured from a predetermined or cut length of multi-layered or multi-ply paper which is then folded upon itself wherein the free ends or sides thereof which are being folded toward each other are then overlapped and glued together so as to define a longitudinally extending seam along, for example, the centerline of what is now, in effect, a paper tube which is open at its opposite ends. The inflatable bladder is then inserted into the interior space defined by the paper tube, and the previously open ends of the tubes are then folded and sealed in any one of a plurality of modes, such as, for example, sewing or stitching, gluing, and the like.

It has been experienced that the manufacture of such cargo bags can be quite labor-intensive in that the inflatable bladder is sometimes difficult to insert into the interior space defined within the outer multi-walled or multi-ply paper tube. In addition, due to the intensity or difficulty which is often encountered in connection with the insertion of the inflatable bladder within the interior space of the outer paper tube and the resulting fabrication of the composite cargo bag, there is considerable potential that the thermoplastic bladder can be damaged, even slightly, during the necessary handling of the same whereby, ultimately, when the composite cargo bag is inflated, and during use thereof during a cargo load bracing operation, leakage of the bladder, and therefore the composite cargo bag, can occur which of course would lead to failure of the composite bag with respect to its intended purposes and functions in bracing cargo loads.

In order to alleviate such aforenoted difficulties attendant the manufacture of composite inflatable cargo bags, an improved cargo air bag, and a method of manufacturing the same, was developed and is disclosed within U.S. Pat. No. 4,591,519 which issued to Liebel on May 27, 1986. In accordance with such disclosure, the outer paper bag is not formed as a tubular member but is formed from a pair of paperboard sheet members which are then, in effect, sealed around the inflatable bladder which is interposed therebetween. More particularly, with reference being made to FIG. 1, which corresponds to FIG. 2 of the noted patent, the composite cargo bag comprises a first sheet of paperboard 16, and a second sheet of paperboard 24. The first sheet of paperboard 16 is provided with opposite side flap members 18, and opposite end flap members 26. In fabricating the composite cargo air bag, an inflatable bladder 22 is disposed upon the first sheet of paperboard 16, the second sheet of paperboard 24 is then disposed upon the inflatable bladder 22, and the side and end flap members 18 and 26 of the first sheet of paperboard 16 are then folded over and glued upon exterior peripheral surface portions of the second sheet 24 of paperboard.

While the aforenoted patented cargo air bag therefore appears to have resolved or eliminated the problem, attendant the fabrication of the composite air bag, comprising the difficulties of handling the inflatable bladder and the insertion of the same within the conventionally formed outer paperboard or multi-ply paper tube, the manufacturing process of the patented cargo air bag nevertheless requires substantial handling of the inflatable bladder 22 during, for example, the positioning or disposition of the same with respect to the first sheet of paperboard 16. In addition, the second sheet of paperboard 24 must then be positioned upon or over, or moved relative to, the inflatable bladder 22 Consequently, real potential still exists with respect to possible damage to the bladder, as a result of such handling of the same, or in connection with the handling of the sheets of paperboard with respect to the bladder, during the manufacture of the composite air bag, whereby, as has been noted, potential leakage of the bladder, and of the composite air bag, which, in turn, can lead to failure of the composite cargo air bag, can undesirably occur during a cargo load bracing operation.

A need therefore exists in the art for an abrasion-resistant inflatable cargo air bag which is relatively easy to manufacture whereby the overall productivity thereof is enhanced, and in addition, which will eliminate or significantly minimize the amount of handling required in connection with the thermoplastic inflatable bladder during the manufacture or fabrication of the composite abrasion resistant cargo air bag so as to significantly reduce leakage of the bladder, and the composite cargo bag, and thereby, in turn, eliminate or reduce the possibility of, or potential for, failure of the composite cargo air bag during a cargo load bracing operation.

OBJECTS OF THE INVENTION

Accordingly, it is an object of the present invention to provide a new and improved abrasion-resistant inflatable cargo air bag, and a method of fabricating the same, which overcomes the various drawbacks characteristic of the prior art.

Another object of the present invention is to provide a new and improved abrasion-resistant, inflatable cargo air bag, and a method of manufacturing the same, wherein the method of manufacturing the composite, abrasion-resistant inflatable cargo air bag is relatively simple so as to enable productivity thereof to be substantially enhanced.

A further object of the present invention is to provide a new and improved abrasion-resistant, inflatable cargo air bag, and a method of manufacturing the same, wherein the method of manufacturing the composite, abrasion-resistant, inflatable cargo air bag significantly reduces or minimizes the amount of handling of the thermoplastic inflatable bladder required in connection with the fabrication of the composite abrasion-resistant cargo air bag whereby the possibility of, or potential for, damage to the bladder, and in turn, ultimate failure of the composite air bag during a cargo load bracing operation, is significantly reduced.

SUMMARY OF THE INVENTION

The foregoing and other objects are achieved in accordance with the teachings of the present invention through the provision of a new and improved composite, abrasion-resistant, inflatable cargo air bag which comprises a liner board, paperboard, or cardboard tube within which a tubular inflatable thermoplastic bladder is already disposed as a result of the composite air bag structure, comprising the tubular liner board and tubular inflatable bladder, being so formed by means of a suitable tuber or tube-forming apparatus or machine. Consequently, at this point in time, the opposite ends of both the outer, tubular liner board, and the inner, tubular thermoplastic inflatable bladder, are open and must be sealed. As a result of the disposition of the inner, tubular thermoplastic inflatable bladder within the outer, tubular liner board, however, a main objective of the present invention is readily and automatically achieved to the effect that the thermoplastic inflatable bladder is not manually handled separately from the outer, tubular liner board, and in addition, opposite surfaces of the thermoplastic inflatable bladder are protected by the upper and lower sections of the outer, tubular liner board.

The opposite open ends of the thermoplastic inflatable bladder are then heat-sealed by any suitable means, and in accordance with one of the significantly new and novel features of the present invention, end caps or end pieces, fabricated from liner board which is similar to the material comprising the outer, tubular liner board of the composite cargo air bag, are mounted upon the open ends of the outer, tubular liner board and sealed thereto by means of a suitable hot melt adhesive, cold glue, or a combination thereof.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
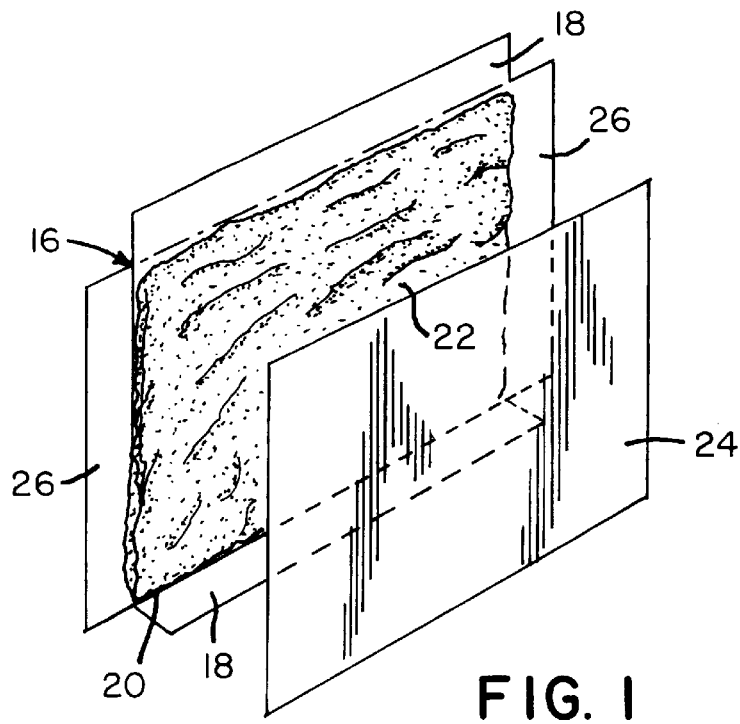
FIG. 1 is perspective, exploded view of a PRIOR ART cargo air bag.
Figure 3:
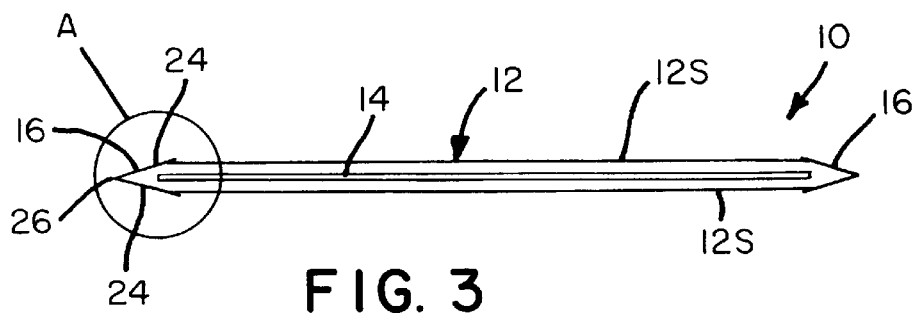
FIG. 3 is a cross-sectional view of the completed composite, abrasion-resistant inflatable cargo air bag, as disclosed in STEP 3 of FIG. 2, constructed in accordance with the teachings and method of the present invention, showing the cooperative parts thereof, and as taken along lines 3—3 of FIG. 2.

Referring now to the drawings, and more particularly and firstly to FIG. 3 thereof, the new and improved composite, inflatable abrasion-resistant air bag constructed in accordance with the teachings and method of the present invention is generally disclosed by the reference character 10 and is seen to comprise an outer, tubular member 12, an inner, tubular, inflatable thermoplastic bladder 14 and a pair of end pieces or end caps 16,16 which are mounted or secured upon the opposite ends of the outer tubular member 12 so as to seal the same in a manner which will be described more in detail hereinafter. The outer tubular member 12 preferably comprises a one-ply, 74–90 pound, liner board tube, and the tubular, inflatable thermoplastic bladder 14 comprises a polyethylene bladder having a thickness, for example, of 3–4 mils. In lieu of liner board material comprising outer tubular member 12, a suitable paper board or cardboard may be used. In addition, the outer tubular member 12 can comprise a multi-ply structure comprising, for example, two 42 pounds plies.

Figure 4:
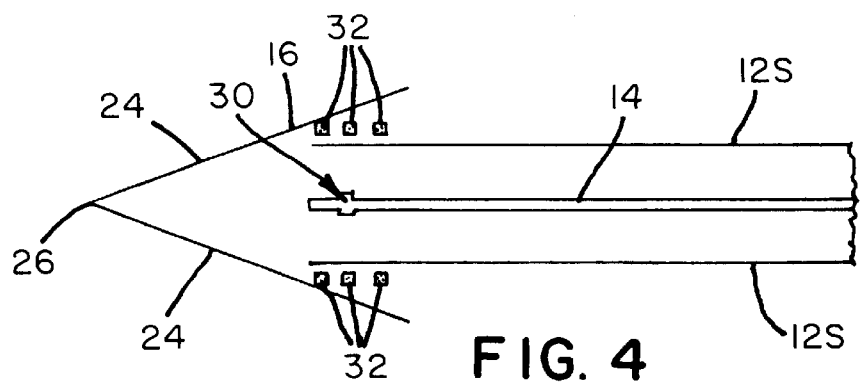
FIG. 4 is an enlarged view of the region A of FIG. 4 which discloses the details of securing each one of the end pieces or end caps upon each open end of the outer tubular, liner board so as to seal the same and thereby form the completed, sealed, composite abrasion-resistant inflatable cargo air bag of the present invention.
Figure 2:
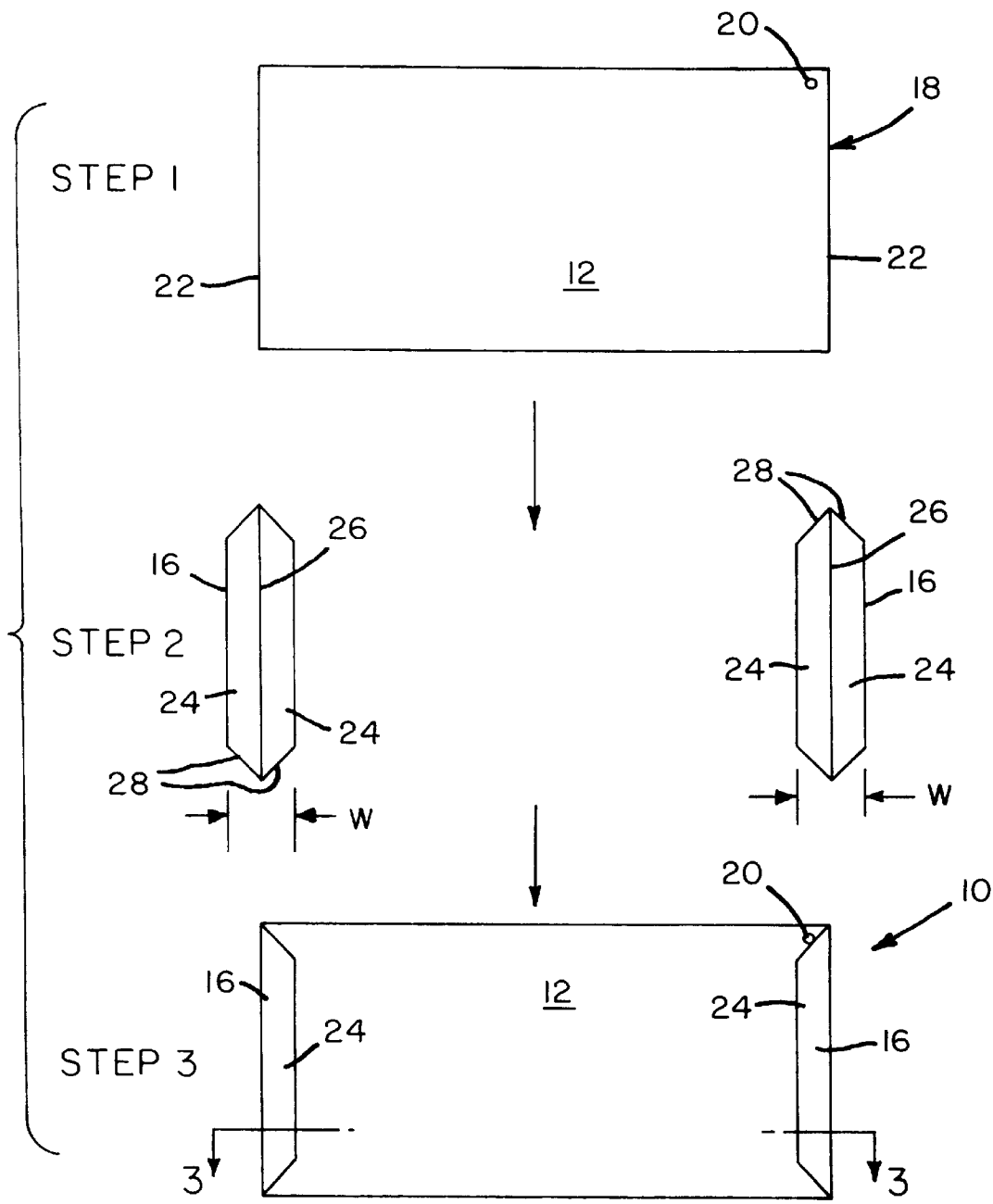
FIG. 2 is a flow chart illustrating, schematically, the method of the present invention by which the new and improved abrasion-resistant, inflatable cargo bag of the present invention is fabricated.

With reference now being additionally made to FIG. 2 of the drawings, wherein the method of manufacturing or fabricating the abrasion-resistant inflatable cargo air bag 10 of the present invention is fully disclosed, the manufacturing or fabrication process begins with the formation of a composite tubular assembly 18 as shown in STEP 1 of FIG. 2 wherein the outer, tubular liner board 12 has the inner, tubular, thermoplastic bladder 14, as shown in FIGS. 3 and 4, but not shown in FIG. 2, already inserted therein as a result of such a composite tubular assembly 18 being formed by means of a suitable tuber or tube-forming apparatus or machine, not shown, whereupon the composite tubular assembly 18 is withdrawn from a suitable roll of the tuber and cut to a predetermined length so as to ultimately form a cargo bag, of a predetermined size.

The inflatable bladder 14 is conventionally fabricated as a tubular extrusion, whereas the liner board 12 is conventionally fabricated in flat paper form and subsequently formed into a tube having a longitudinally extending seam defined by means of overlapped longitudinally extending edge portions of the paper form. The outer tubular liner board member thus comprises a pair of sections 12s,12s disposed parallel to, but spaced from, each other so as to accommodate the inflatable bladder 14 therebetween. The inflatable bladder 14 is also of course provided in a conventional manner with an inflation valve 20 which is heat-sealed to the bladder 14 and which projects outwardly through a suitable aperture formed within, for example, a corner region of one of the sections 12s of the outer liner board 12, that is, within either the upper or lower section 12s of the liner board 12 as considered or viewed in FIG. 3. It is thus to be appreciated that at this point in time in accordance with the manufacturing or fabricating process or method of the present invention, the opposite ends 22 of the composite tubular assembly 18, comprising the outer, tubular liner board member 12 and the inner, tubular inflatable bladder 14, are open and must be sealed. More particularly, the manner in which such opposite open ends 22 of the tubular assembly 18 are closed and sealed comprises the novelty of the present invention.

With continued reference being made to FIG. 2, and in accordance with STEP 2 of the manufacturing or fabricating process or method of the present invention as disclosed in FIG. 2, the pair of end pieces or end caps 16,16 are fabricated. The end pieces or end caps 16,16 are formed from liner board material which is similar to that comprising the outer, tubular liner board 12, however, as was the case in connection with the selection of materials from which the outer, tubular member 12 was fabricated, the end caps or pieces 16,16 can also be fabricated from suitable paperboard or cardboard. It is seen from STEP 2 of FIG. 2 that each one of the end pieces or end caps 16 initially comprises a flat, scored piece or section of liner board which is, in effect, subsequently folded in half upon itself when the end pieces 16,16 are mounted upon the tubular assembly 18. In the latter mode, it is seen that each one of the end caps or pieces 16 has a substantially triangular configuration in cross-section comprising a pair of oppositely disposed, divergent legs 24,24 which are of course integrally connected together at an apex region 26 which corresponds to the location at which the end piece or cap 16 is scored. This structure can also be additionally appreciated from FIGS. 3 and 4 wherein the end caps or end pieces 16,16 are shown assembled or mounted upon the outer surface portions of the liner board sections 12s,12s. The details of the actual mounting, securing, and sealing of the end caps or end pieces 16,16 upon the outer surface portions of the liner board sections 12s,12s will be discussed shortly hereinafter.

It is further appreciated that each one of the end caps or pieces 16,16 has a width dimension W, when disposed in its flattened, scored state, of approximately four to six inches (4–6") so as to impart a requisite amount of strength to the sealed ends of the composite cargo bag 10 when the end pieces or caps 16,16 are mounted and secured upon the end regions of the tubular assembly 18, and in addition, when the composite cargo bag 10 is inflated. This provision of the end caps or end pieces 16,16 as being formed from liner board or the like, and having a predetermined width dimension W, is a critically important feature of the assembled composite cargo bag 10 in that as a result of such structure, the requisite amount of tensile strength, and burst strength of the sealed ends of the cargo bag 10, as well as that of the cargo bag 10 per se, is able to be provided or achieved. Such strength characteristics would not be able to be achieved through the provision of, for example, a binding material such as that which is disclosed at 15 in U.S. Pat. No. 5,788,438 which issued to Goshorn et al. on Aug. 4, 1998 and which is assigned to a common assignee of the present patent application. The binding 15 of the noted patent is not provided for sealing or closing the open ends of the disclosed cargo bag, but is in fact provided as a means for facilitating the sewing or stitching operation or process of the cargo bag ends as disclosed at 17 during a continuous flow cargo bag fabrication process. The stitching 17 of the cargo bag ends is provided for sealing and closing the ends of the cargo bag and imparts the necessary tensile strength and burst strength characteristics to the cargo bag. It is also noted that in addition to the aforenoted material and width dimension characteristics of the end caps or end pieces 16,16, the upper and lower end regions 28 of each end piece or cap 16 are chamfered or cut at an angle of approximately 450 with respect to the longitudinal score line 26 such that when the end pieces or caps 16,16 are mounted and sealed upon the tubular assembly 18 and the composite cargo air bag 10 is inflated, the surfaces of the end cap legs or sides 24,24 will tend to smoothly physically conform with the sections 12s,12s of the bag 10 in their inflated and expanded states.

With reference lastly being made to STEP 3 of FIG. 2, as well as to FIG. 4, when the end caps or pieces 16,16 are to be mounted and secured upon the open end regions of the composite tubular assembly 18 in order to close and seal such open end regions and thereby complete fabrication or manufacture of the composite cargo air bag 10, each one of the open ends of the thermoplastic inflatable bladder 14 is heat sealed closed as shown at 30 in FIG. 4. Subsequently, the end caps or end pieces 16,16 are mounted and secured upon the open end regions of the composite tubular assembly 18 so as to close and seal the same. More particularly,, a suitable adhesive 32 is applied to either an external surface region of one of the outer liner board sections 12s,12s and/or to a surface region of one of the leg members 24 of an end cap or piece 16, and that leg member 24 is compressively disposed in contact with the respective external surface region of the outer liner board section 12s so as to permit the adhesive 32 to secure the end cap leg member 24 to the external surface region of the liner board section 12s. Adhesive 32 is then applied in a similar manner to the other external surface region of the other liner board section 12s, and/or to the other leg member 24 of the end cap or end piece 16, and the end cap or end piece 16 is then folded in half upon itself and along the score line 26 so as to bring the other leg member 24 of the end cap or end piece 16 into contact with the other liner board section 12s. As a result of compressive pressure or contact between such other leg member 24 of the end cap or end piece 16 and the other liner board section 12s, the end cap or end piece 16 will be completely adhered or bonded to the tubular assembly 18, thereby completing the fabrication of the abrasion-resistant inflatable cargo bag 10.

It is to be noted that adhesive 32 is illustrated as comprising, for example, three beads of adhesive, however, a greater or lesser number of adhesive beads can of course be utilized as may be desired or required. In addition, the adhesive may comprise, for example, a suitable hot melt adhesive, a suitable cold glue, or a combination thereof, depending upon the use applications of the composite abrasion-resistant cargo air bag 10 as well as the environmental conditions under which the bag 10 will be used. It is known, for example, that hot melt adhesive tends to adhere more readily than cold glue when first applied to the surfaces to be bonded together, that is, cold glue requires a considerable amount of time to set. However, cold glue retains its adherence or bonding characteristics or integrity better than hot melt adhesive under, for example, high temperature conditions.

Thus, it may be seen that in accordance with the present invention, a new and improved abrasion-resistant, inflatable cargo air bag, and a method of manufacturing the same, has been developed which is simple to manufacture or fabricate, which therefore enhances productivity, and in addition, due to the fact that the inflatable bladder is not manually handled separately from the outer composite bag paper plies, damage to the bladder is remarkably eliminated or reduced whereby, in turn, leakage and failure problems attendant such abrasion-resistant, inflatable cargo bags is likewise reduced or eliminated.

Obviously, many modifications and variations of the present invention are possible in light of the foregoing teachings. It is therefore to be understood that within the scope of the appended claims, the present invention may be practiced otherwise than as specifically described herein.

What is claimed as new and desired to be protected by Letters Patent of the United States of America, is:

1. An abrasion-resistant air bag, comprising:

an outer tubular paper member having first and second ply sections thereof disposed parallel to, and spaced from, each other so as to define an internal space therebetween, an aperture defined within one of said first and second ply sections of said outer tubular paper member, said outer tubular paper member having a predetermined longitudinal extent, and wherein opposite ends of said outer tubular paper member are open;

an inflatable bladder disposed within said internal space defined between said first and second ply sections of said outer tubular paper member and having a predetermined longitudinal extent substantially equal to said predetermined longitudinal extent of said outer tubular paper member such that opposite ends of said inflatable bladder are substantially coincident with said opposite open ends of said outer tubular paper member whereby opposite ends of said air bag comprise a three-member laminate structure comprising said first and second ply sections of said outer tubular paper member and said inflatable bladder;

a means hermetically sealed to said inflatable bladder and projecting outwardly through said aperture defined within said one of said first and second ply sections of said outer tubular paper member for enabling inflation of said inflatable bladder; and a pair of end caps, separate and independent from said outer tubular paper member, respectively secured to outer surface portions of said opposite open ends of said outer tubular paper member so as to envelop said three-member laminate structure at each one of said opposite ends of said air bag and thereby define a three-layer sealed structure for closing and sealing said opposite open ends of said outer tubular paper member and said opposite ends of said air bag.

2. An abrasion-resistant air bag as set forth in claim 1, wherein:

said outer tubular paper member is fabricated from a material selected from the group comprising liner board, paper board, and cardboard.

3. An abrasion-resistant air bag as set forth in claim 1, wherein:

each one of said pair of end caps is fabricated from liner board material.

4. An abrasion resistant air bag as set forth in claim 1, wherein:

each one of said pair of end caps comprises a substantially flat, scored piece of liner board which is folded in half upon itself when secured to said respective ones of said outer surface portions of said first and second ply sections of said outer tubular paper member.

5. An abrasion-resistant air bag as set forth in claim 4, wherein:

each one of said pair of end caps has a substantially triangular configuration in cross-section when folded in half upon itself.

6. An abrasion-resistant air bag as set forth in claim 5, wherein:

each one of said pair of substantially triangular end caps comprises a pair of leg members integrally interconnected together at an apex portion.

7. An abrasion-resistant air bag as set forth in claim 6, wherein:

each one of said pair of leg members comprises an inner surface portion which is secured to a respective one of said outer surface portions of said first and second ply sections of said outer tubular paper member.

8. An abrasion-resistant air bag as set forth in claim 4, wherein:

each one of said substantially flat, scored pieces of liner board comprising said end caps has a width dimension of approximately four to six inches (4.00–6.00").

9. An abrasion-resistant air bag as set forth in claim 4, wherein:

each one of said substantially flat, scored pieces of liner board comprising said end caps has its opposite ends chamfered so that when said substantially flat, scored pieces of liner board are folded in half upon themselves and secured upon said opposite open ends of said outer tubular paper member, said chamfered ends of said end caps will smoothly physically conform to the contours of said first and second ply sections of said outer tubular paper member when said air bag is inflated.

10. An abrasion-resistant air bag as set forth in claim 1, further comprising:

adhesive means interposed between said end caps and said first and second ply sections of said outer tubular paper member for securing said end caps to said first and second ply sections of said outer tubular paper member.

11. An abrasion-resistant air bag as set forth in claim 10, wherein:

said adhesive means is selected from a group of adhesives comprising hot melt adhesive, cold glue, and a combination of said hot melt adhesive and said cold glue.

12. An abrasion-resistant air bag, comprising:

an outer tubular paper member having first and second ply sections thereof disposed parallel to, and spaced from, each other so as to define an internal space therebetween, an aperture defined within one of said first and second ply sections of said outer tubular paper member, said outer tubular paper member having a predetermined longitudinal extent, and wherein opposite ends of said outer tubular paper member are open;

an inflatable bladder disposed within said internal space defined between said first and second ply sections of said outer tubular paper member and having a predetermined longitudinal extent substantially equal to said predetermined longitudinal extent of said outer tubular paper member such that opposite ends of said inflatable bladder are substantially coincident with said opposite open ends of said outer tubular paper member whereby opposite ends of said air bag comprise a three-member laminate structure comprising said first and second ply sections of said outer tubular paper member and said inflatable bladder;

a means hermetically sealed to said inflatable bladder and projecting outwardly through said aperture defined within said one of said first and second ply sections of said outer tubular paper member for enabling inflation of said inflatable bladder; and a pair of end caps, separate and independent from said outer tubular paper member, adhesively bonded to outer surface portions of said opposite open ends of said outer tubular paper member so as to envelop and cover said three-member laminate structure at each one of said opposite ends of said air bag and thereby define a three-layer sealed structure for closing and sealing said opposite open ends of said outer tubular paper member and said opposite ends of said air bag.

13. An abrasion-resistant air bag as set forth in claim 12, wherein:

said outer tubular paper member is fabricated from a material selected from the group comprising liner board, paper board, and cardboard.

14. An abrasion-resistant air bag as set forth in claim 12, wherein:

each one of said pair of end caps is fabricated from liner board material.

15. An abrasion resistant air bag as set forth in claim 12, wherein:

each one of said pair of end caps comprises a substantially flat, scored piece of liner board which is folded in half upon itself when secured to said respective ones of said outer surface portions of said first and second ply sections of said outer tubular paper member.

16. An abrasion-resistant air bag as set forth in claim 15, wherein:

each one of said pair of end caps has a substantially triangular configuration in cross-section when folded in half upon itself.

17. An abrasion-resistant air bag as set forth in claim 16, wherein:

each one of said pair of substantially triangular end caps comprises a pair of leg members integrally interconnected together at an apex portion.

18. An abrasion-resistant air bag as set forth in claim 17, wherein:

each one of said pair of leg members comprises an inner surface portion which is secured to a respective one of said outer surface portions of said first and second ply sections of said outer tubular paper member.

19. An abrasion-resistant air bag as set forth in claim 15, wherein:

each one of said substantially flat, scored pieces of liner board comprising said end caps has a width dimension of approximately four to six inches (4.00–6.00").

20. An abrasion-resistant air bag as set forth in claim 15, wherein:

each one of said substantially flat, scored pieces of liner board comprising said end caps has its opposite ends chamfered so that when said substantially flat, scored pieces of liner board are folded in half upon themselves and secured upon said opposite open ends of said outer tubular paper member, said chamfered ends of said end caps will smoothly physically conform to the contours of said first and second ply sections of said outer tubular paper member when said air bag is inflated.

21. An abrasion-resistant air bag as set forth in claim 12, wherein:

said pair of end caps are adhesively bonded to said outer surface portions of said opposite open ends of said outer tubular paper member by adhesive means which is selected from a group of adhesives comprising hot melt adhesive, cold glue, and a combination of said hot melt adhesive and said cold glue.

* * * * *